(12) United States Patent
Holland et al.

(10) Patent No.: US 6,606,986 B2
(45) Date of Patent: Aug. 19, 2003

(54) BARBEQUE GRILL WITH RETRACTABLE VENTILATION SYSTEM

(75) Inventors: Robert Braxton Holland, Cary, NC (US); Jeffrey Alan McCulloch, Willow Springs, NC (US); Stephen Earl Southers, Benson, NC (US)

(73) Assignee: The Holland Company, Inc. of the Carolinas, Holly Springs, NC (US)

( * ) Notice: Subject to any disclaimer, the term of this patent is extended or adjusted under 35 U.S.C. 154(b) by 0 days.

(21) Appl. No.: 09/899,496

(22) Filed: Jul. 5, 2001

(65) Prior Publication Data

US 2002/0179081 A1 Dec. 5, 2002

Related U.S. Application Data

(60) Provisional application No. 60/295,772, filed on Jun. 4, 2001.

(51) Int. Cl.[7] ................................................. F23L 11/00
(52) U.S. Cl. ................................ 126/25 R; 126/307 R; 126/39 R; 126/41 R; 126/292; 126/285; 126/295; 126/296
(58) Field of Search ................................ 126/9 R, 9 B, 126/25 R, 41 R, 39 R, 307 R, 314, 316, 319, 289, 285 R, 292, 295, 296, 285 A

(56) References Cited

U.S. PATENT DOCUMENTS

| | | | | |
|---|---|---|---|---|
| 880,106 A | * | 2/1908 | Shimek | 126/4 |
| 937,890 A | * | 10/1909 | Swinney | |
| 1,379,372 A | * | 5/1921 | Verhunce | |
| 1,795,542 A | * | 3/1931 | Currie | |
| 2,626,559 A | * | 1/1953 | Rau | |
| 2,687,716 A | * | 8/1954 | Wong | |
| 2,798,476 A | * | 7/1957 | Marion, Jr. | |
| 3,446,010 A | * | 5/1969 | Hopkins | |
| 4,729,364 A | * | 3/1988 | Dailey | 126/39 R |
| 4,776,317 A | * | 10/1988 | Pinnow et al. | 126/37 R |
| 4,840,118 A | * | 6/1989 | Rinehart | 99/446 |
| 4,862,792 A | * | 9/1989 | Lerma, Jr. | |
| 5,370,940 A | * | 12/1994 | Hazlitt et al. | 428/516 |
| 5,404,795 A | * | 4/1995 | Coble | 99/339 |
| 5,404,801 A | * | 4/1995 | Holland | |
| 5,536,518 A | * | 7/1996 | Rummel | 426/523 |

\* cited by examiner

Primary Examiner—Carl D Price
(74) Attorney, Agent, or Firm—Jenkins, Wilson & Taylor, P.A.

(57) ABSTRACT

A barbeque grill including a lower housing, heating means and food support means positioned within the lower housing, an upper housing or hood adapted to enclose the lower housing, a smoke exhaust means provided in said upper and/or lower housing for allowing smoke to escape from within the barbeque grill, wherein said smoke exhaust means is retractable/collapsible in order to allow the oven or grill to take up the least amount of space when being stored or transported.

6 Claims, 7 Drawing Sheets

BARBEQUE GRILL WITH RETRACTABLE VENTILATION SYSTEM

This application claims the benefit of Provisional application Ser. No. 60/295,772, filed Jun. 4, 2001.

TECHNICAL FIELD

The present invention relates generally to barbeque grills for cooking meats and other foods. More particularly, the present invention relates to an improved barbeque grill which is provided with a smoke exhaust vent system that is retractable or collapsible.

RELATED ART

Outdoor barbeque grills have become very popular for outdoor cooking and are particularly enjoyed by friends and families at personal and social events. As is well known to one skilled in the art, barbeque grills utilize different types of heating means for cooking meats and other foods. A conventional and well-known type of barbeque grill utilizes combustible charcoal briquettes (or wood chips and/or wood pellets) which must be replenished with each use of the grill for cooking. More recently, barbeque grills utilizing propane gas and electric heating elements have become very popular and displaced many conventional grills which use combustible charcoal briquettes.

The propane gas and electric barbeque grills act to heat permanent cement briquettes or lava rock so that greases from the food being cooked will fall thereon and be vaporized in order to create a smoke environment for the food being cooked and impart additional smokey aroma and flavor thereto similar to the flavor imparted to food being cooked with conventional combustible briquettes on a barbeque grill. Thus, the propane gas and electrically heated barbeque grills provide a measure of convenience which is not obtainable with conventional combustible briquette heated barbeque grills. Yet, the more convenient and popular propane gas and electrically heated barbeque grills provide substantially the same measure of tasty, smokey flavor which outdoor cooks obtain from old-fashioned, conventional barbeque grills.

Regardless of the type of barbeque grill utilized for outdoor cooking, it is well known that grease droppings from meat being cooked in a grill fall onto a component such as a steel drip pan, combustible charcoal briquettes, wood chips, wood pellets, permanent cement briquettes, or lava rock. The grease droppings are vaporized and create smoke within the grill. It is common therefore for grills to use some type of a smoke exhaust vent in order to vent the smoke created in the grill. While smoke vent designs have been found to be visually pleasing as well as functional it was found that the permanent smoke vent arrangement created a problem when trying to store or transport the barbeque grill.

The quest has therefore continued for a barbeque grill which is more compact and transportable, but yet still fully functional and easy to use.

DISCLOSURE OF THE INVENTION

In accordance with the present invention, an improved barbeque grill is provided which solves the problems associated with prior art grill designs and provides a barbeque grill which can be compact and easily transportable. The grill contains a smoke exhaust vent system that is retractable or collapsible in order to allow the oven or grill to take up the least amount of space when being stored or transported.

The improved barbeque grill of the present invention in a preferred embodiment comprises a lower housing, heating means for providing cooking heat located within the lower housing, food supporting means positioned within the lower housing and above the heating means, and an upper housing or hood adapted to enclose the lower housing. The upper and/or lower housing includes a smoke exhaust arrangement for allowing smoke to escape from within the barbeque grill, wherein the smoke exhaust arrangement is retractable or collapsible in order to allow the oven or grill to take up the least amount of space when being stored or transported.

Accordingly, it is an object of the present invention to provide a barbeque grill which can be compact and easily transportable.

It is another object of the present invention to provide a barbeque grill that enables a user to lower conventional smoke exhaust stacks into the lid when not in use in order to save space during storage or transport.

A further object of the present invention is to provide a barbeque grill with a retractable or collapsible vent system that allows the vent disengagement and movement to be made simple and "by hand" with no tools needed, and the engagement to be positive yet forgiving, requiring no critical or precise alignment procedures or components.

A still further object of the present invention is to provide a barbeque grill with a retractable or collapsible vent system in which the visual appearance and mechanical stability and sturdiness of the stacks in the "up" position are comparable to conventional fixed-mount stack systems.

A still further object of the present invention is to provide a barbeque grill with hardware or mechanisms for engagement/disengagement of the retractable/collapsible vent stacks that are visually unobtrusive.

Some of the objects of the invention having been stated, other objects will become evident as the description proceeds, when taken in connection with the accompanying drawings described below.

BEST MODE FOR CARRYING OUT THE INVENTION

Figure 1:
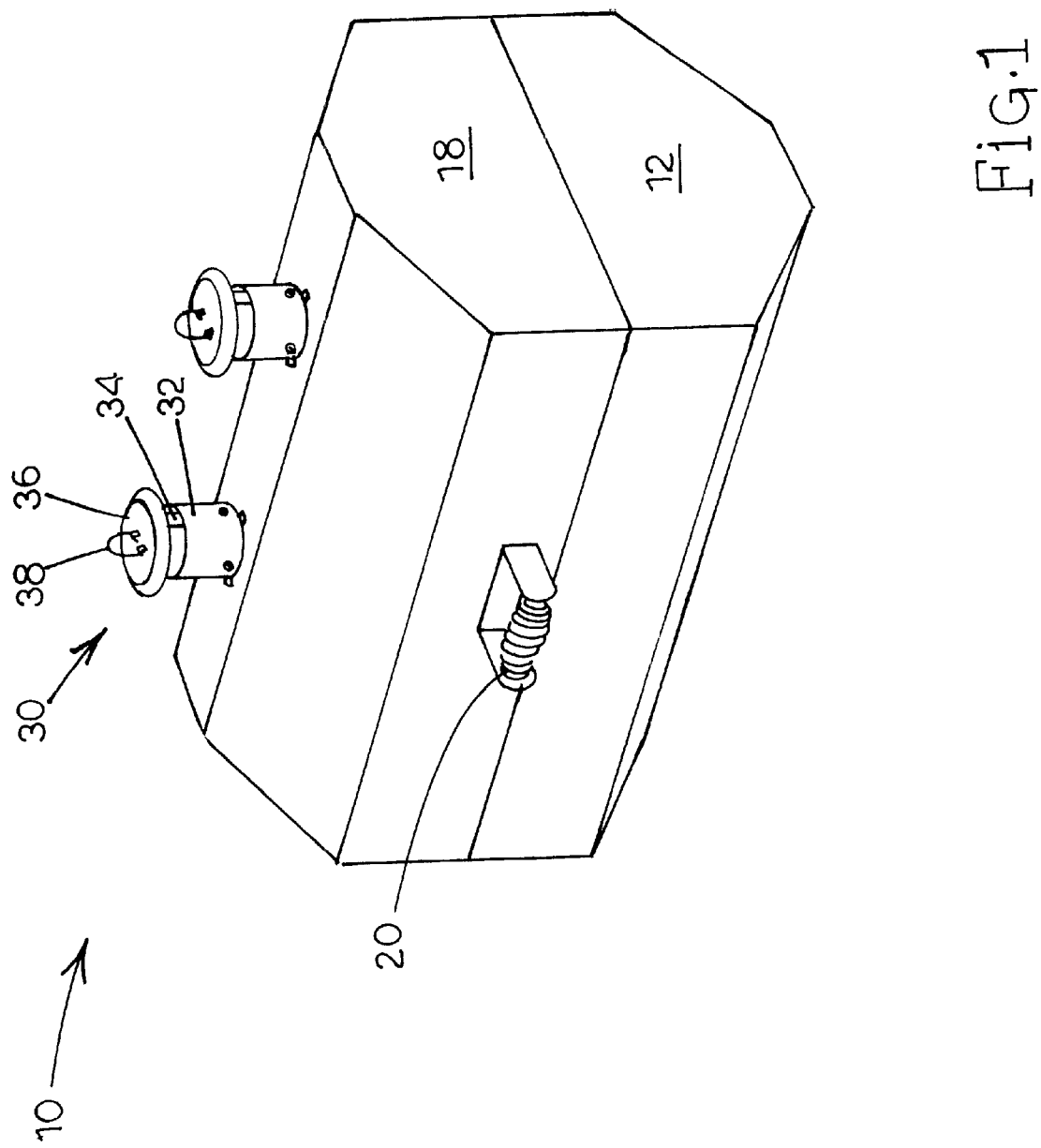
FIG. 1 is an perspective view of the barbeque grill with retractable vent system of the present invention.
Figure 2:
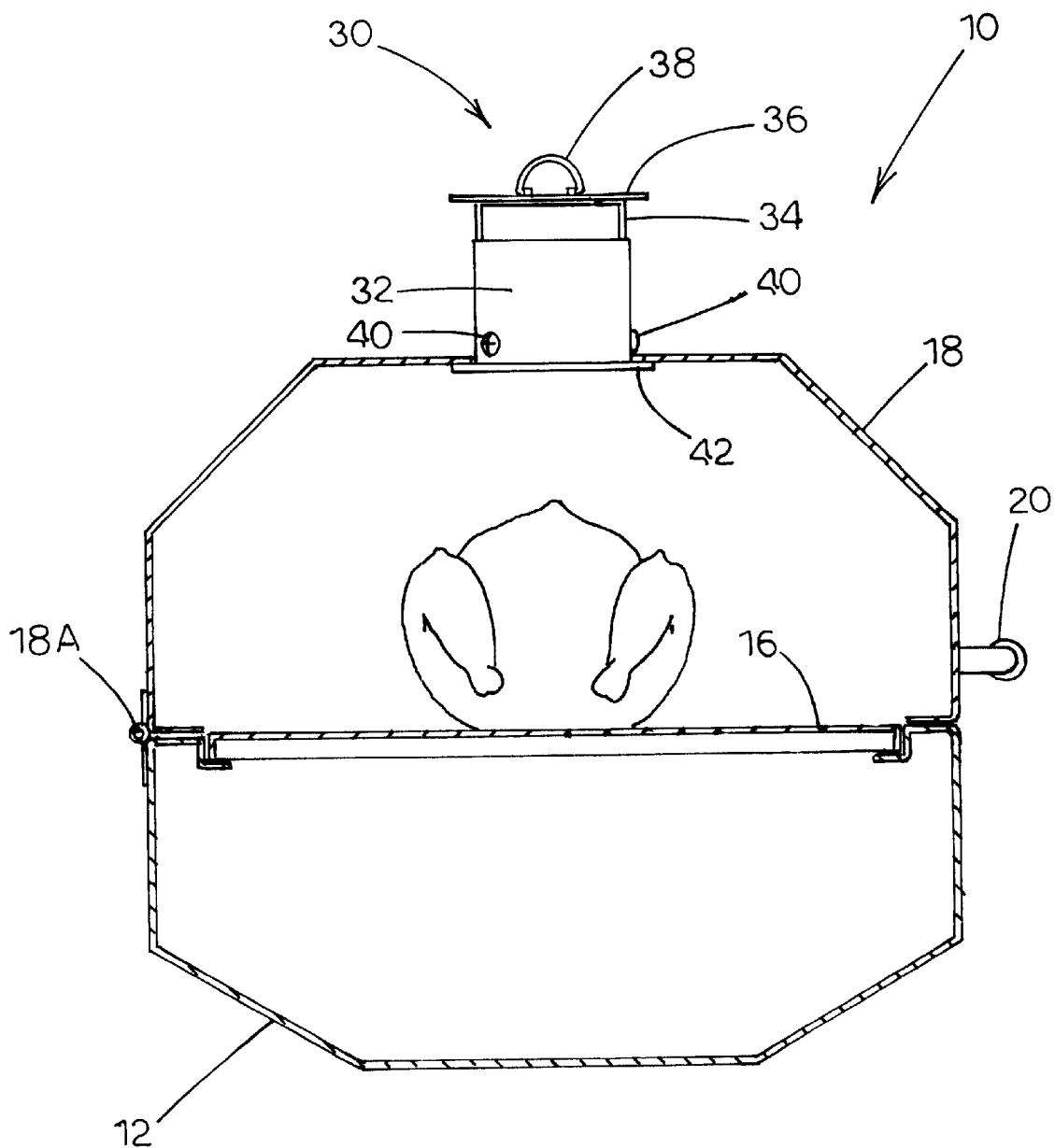
FIG. 2 is a vertical cross-section view of the barbeque grill with retractable vent system of the present invention.
Figure 3:
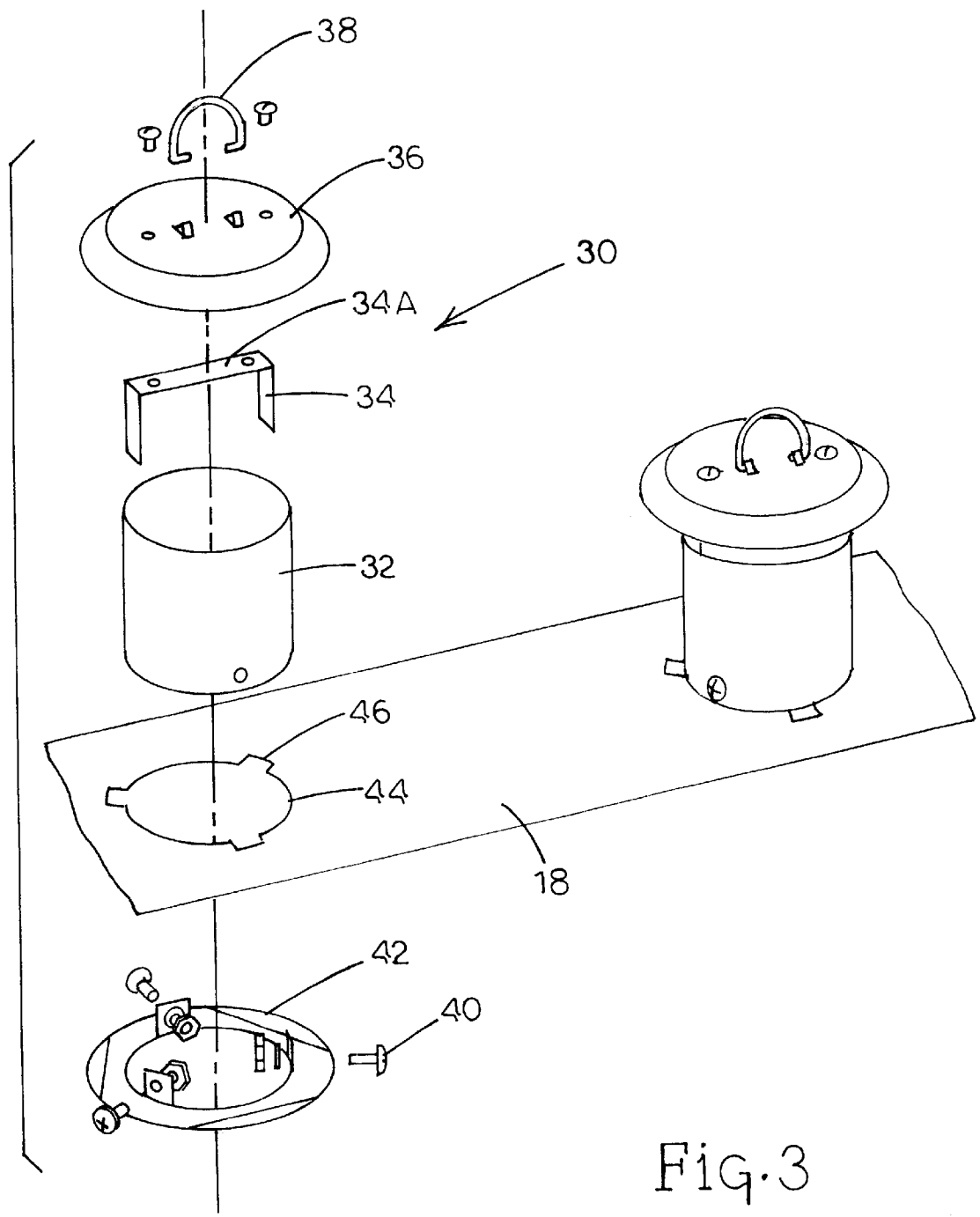
FIG. 3 is a perspective view, with parts broken away for clarity, of the retractable vent system utilized on the grill shown is FIGS. 1 and 2.
Figure 4:
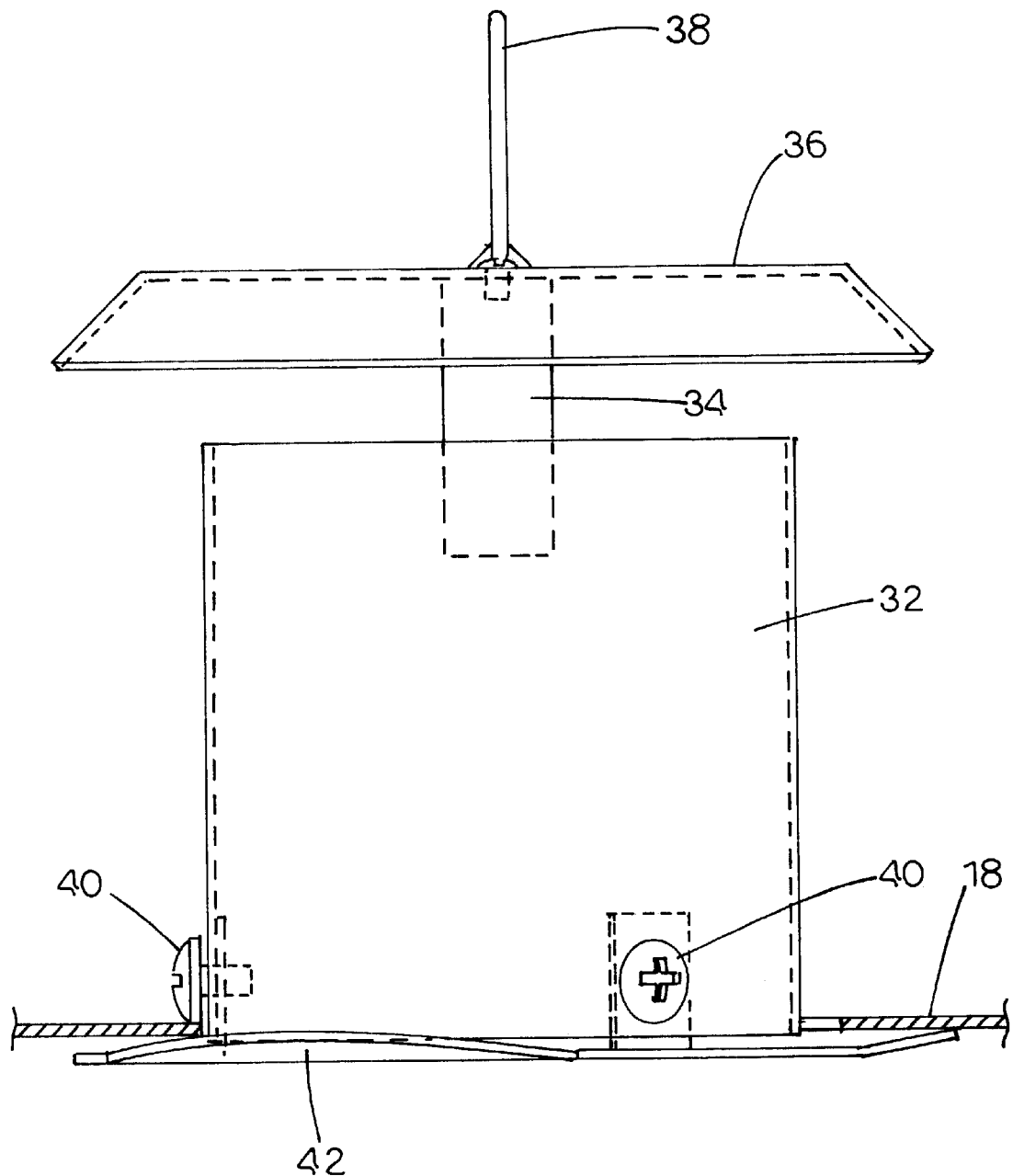
FIG. 4 is a cross-section side view of the retractable vent system showing engagement to lid panel.
Figure 5:
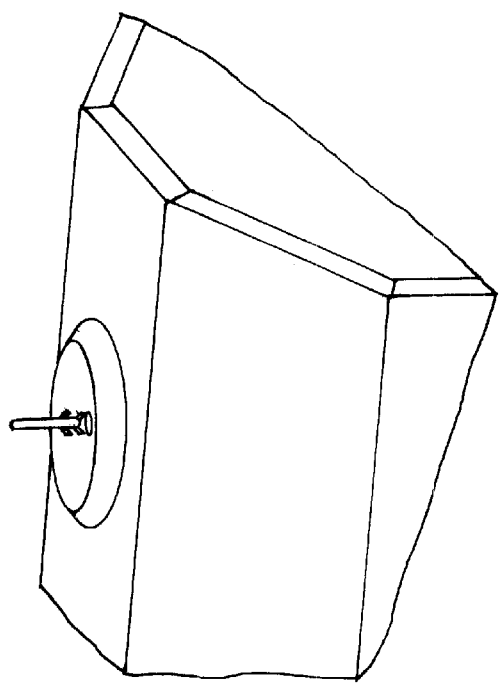
FIGS. 5–8 are perspective views of the operation of the retractable vent system.
Figure 6:
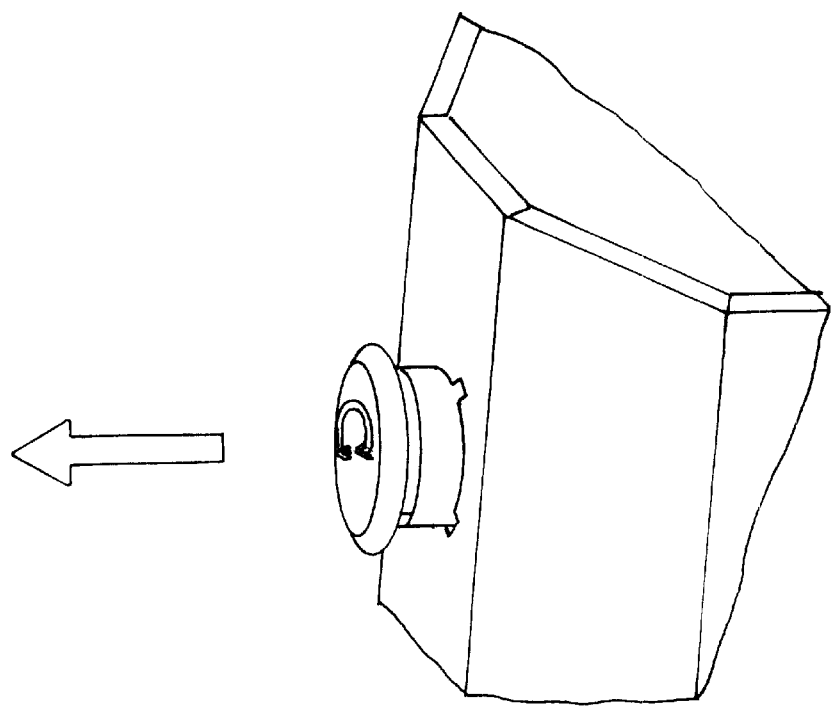
Figure 7:
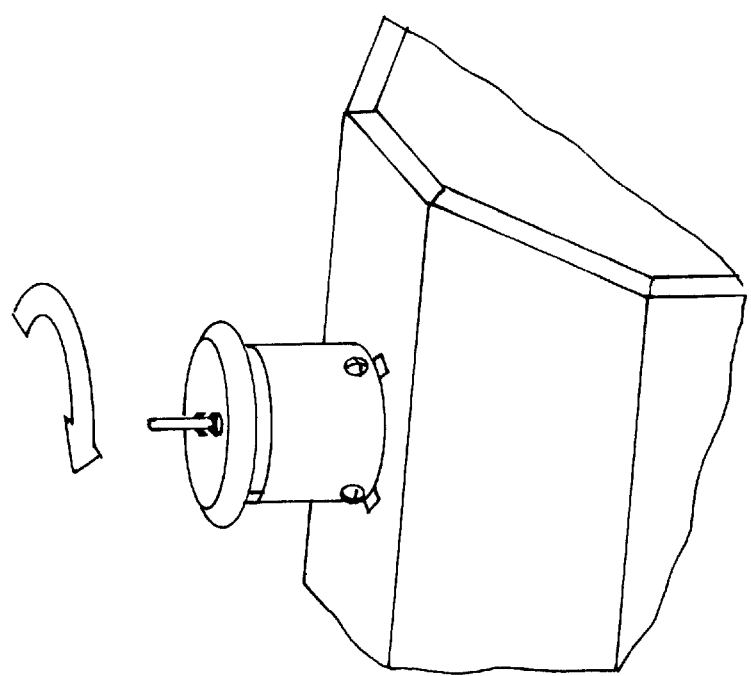
Figure 8:
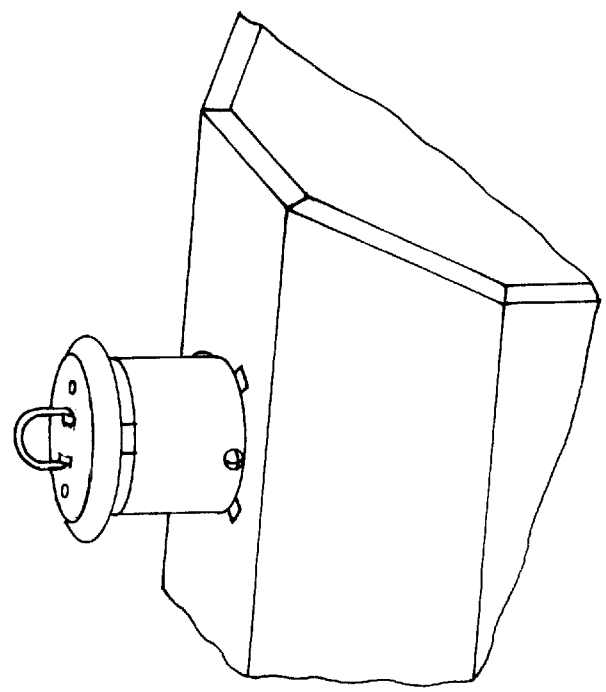

Referring now more specifically to the drawings, a preferred embodiment of the invention is shown in FIGS. 1 through 8. More specifically, the barbeque grill with retractable vent system is designated generally by reference numeral 10.

Portable barbeque grill 10 comprises a lower housing 12, which may or may not be mounted on legs, and in which is positioned a first metallic grid 16 for supporting meat and other foods during cooking on barbeque grill 10. Although other material could be utilized, most suitably lower housing 12 is constructed of aluminum and metallic grid 16 is constructed of stainless steel.

An upper housing or hood 18 is mounted to lower housing 12 by a hinge 18A. Thus, upper housing 18 can be pivotally raised into an open position in order to place food onto grid 16 and then lowered in order to enclose grill 10 during the cooking process. Although upper housing 18 is shown as pivotally mounted to lower housing 12 by hinge 18A, it should be appreciated that upper housing 18 can be of any suitable construction including being an entirely removable hood-type upper housing. Upper housing 18 similarly to lower housing 12 most preferable is constructed of aluminum.

Figure 9:
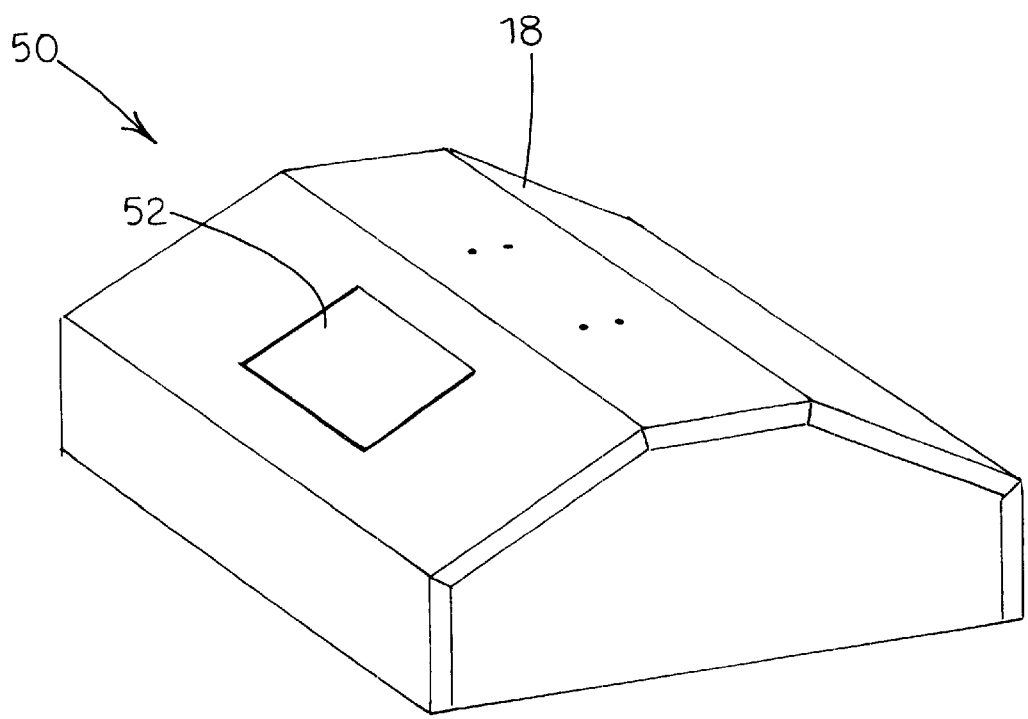
FIGS. 9 and 10 are perspective views of a second embodiment of the barbeque grill with retractable vent system of the present invention.
Figure 10:
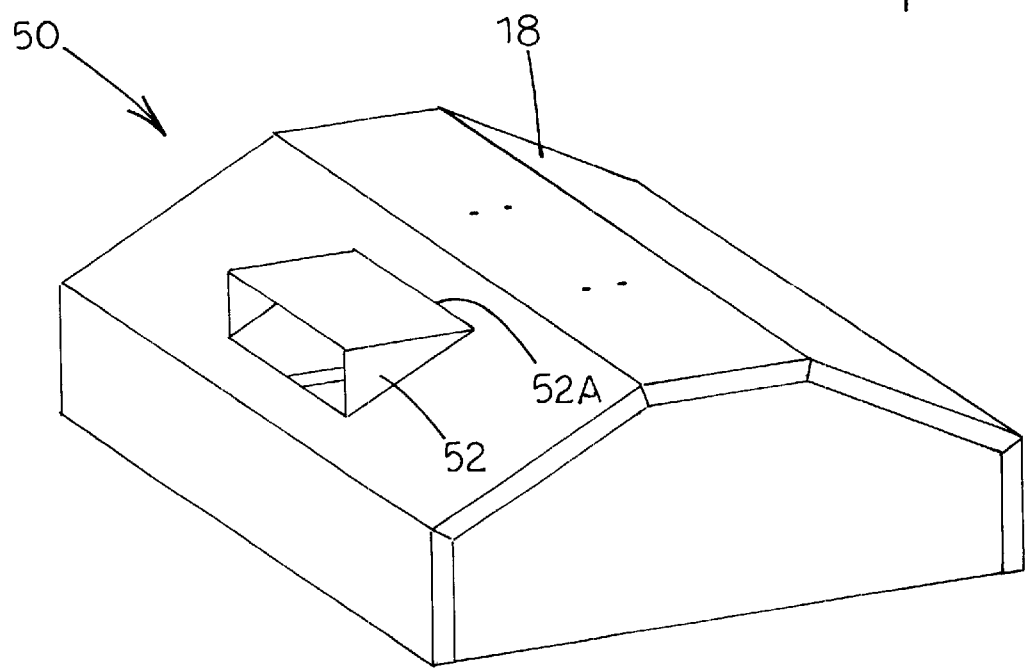

Upper housing 18 further includes handle 20 and, very importantly, at least one retractable smoke exhaust vent, or stack assembly 30. Although retractable smoke exhaust vent 30 could be formed in many different types of configurations, FIGS. 1 through 8 depict a single cylindrical chimney-type retractable smoke exhaust vent 30. A second type of retractable smoke exhaust vent is shown in FIGS. 9 and 10 and will also be discussed in detail hereinbelow.

Referring particularly now to FIGS. 3 through 8, the construction and operation of a preferred embodiment of retractable smoke exhaust vent 30 can be fully appreciated. Specifically, retractable smoke exhaust vent 30 is formed from a tube assembly 32, which can be circular in shape in a preferred embodiment, wherein tube assembly 32 contains two upstanding support arms 34 which are suitably secured to the inside of housing 32 by welding or any other suitable means and connected together at the top by means of crossbar 34A. Top plate 36 is suitably secured by welding or any other suitable means to crossbar 34A in order to protect retractable smoke exhaust vent 30 from rain or the like during use of grill 10. A "pull" device 38 such as a wire lifting "ring" can be fastened to the outer upper surface of the top plate 36 to provide a means of lifting the stack assembly 30 into position for engagement to the panel 18.

Stack assembly 30 secures into the cooking chamber lid panel 18 in such a manner as to be both free to rotate radially about the plane and telescope up and down perpendicular to the plane of the panel. A stable "fixed" location of the smoke exhaust vent, such as is used during the cooking process, is achieved by the locking of stack assembly 30 to lid panel 18 in an upright position, accomplished preferably by (a) a series of evenly spaced cylindrical pins 40 (typically 3) located radially about the outer surface of tube diameter 32 and (b) a circular retaining ring 42 of a somewhat flexible "spring" nature which serves to both captivate the surface panel 18 between itself and pins 40, and to provide tension between itself and pins 40. This state of tensioned captivation is employed to allow for a "friction" fit of stack assembly 30 in lid panel 18. Simple machine screws or any other suitable means as can be appreciated by those of skill in the art can be employed as pins 40 or other suitable structure for securing retaining ring 42 to the bottom edge of tube 32 as well as to provide the means of engaging stack assembly 30 to lid panel 18.

Mounting lid panel 18 is preferably provided with a circular cutout 44 slightly larger than the outside diameter of tubing 32 to allow for free movement of the tube perpendicular to the plane of the panel. In addition, a series of evenly spaced notches 46 (matching the quantity of pins 40) are preferably located about the outer diameter of circular cutout 44. These notches 46 are slightly larger than the profile of pins 40 allowing the tube and pin assembly to pass freely through the plane of the mounting panel 18 when pins 40 are aligned with notches 46.

As shown in FIGS. 5–8, the action of engaging stack assembly 30 (from the retracted position) to panel 18 is accomplished by aligning pins 40 with notches 46, which then allows stack assembly 30 to move up through panel 18 until captivated by retaining disc 42. Stack assembly 30 can then be rotated. This action now utilizes the lower curvature of pin 40 diameter as a cam or ramp against panel surface 18 to provide a gradual tensioning of retaining ring 42 against panel 18, as stack assembly 30 is rotated. The act of lowering stack assembly 30 can be accomplished in the reverse order.

An alternative retractable smoke exhaust vent system, generally designated 50, is shown in FIGS. 9 and 10 and will now be described. In this embodiment, a swing-up vent is made preferably of a three-sided sheet-metal panel 52 hinged at one side 52A and retracts up and down in grill lid panel 18. When the grill is not in use, vent assembly 52 simply pivots down into grill lid 18 and when the grill is in use vent assembly 52 locks in the up position.

As can be appreciated, although two preferred embodiments of the invention have been disclosed, applicant contemplates that other embodiments of the invention are possible which would incorporate a retractable exhaust system. The portable grill can be of any suitable type and still be within the scope of the instant invention, including barbeque grills utilizing conventional charcoal briquettes as the heat source as well as grills utilizing other heating means such as propane gas or electricity. Also, the invention is intended to encompass grills which incorporate the novel exhaust system in the lower housing thereof (either alone or in combination with a similar exhaust system in the upper housing). Thus, the invention is broadly contemplated as providing a retractable exhaust vent system of any type of outdoor barbeque grill-type cooking apparatus.

It will be understood that various details of the invention may be changed without departing from the scope of the invention. Furthermore, the foregoing description is for the purpose of illustration only, and not for the purpose of limitation—the invention being defined by the claims.

What is claimed is:

1. A barbeque grill apparatus with a collapsible vent assembly, said grill apparatus comprising:
    (a) a housing having an upper and a lower portion, an open cutout, and a notch formed outwardly from an edge of the cutout;
    (b) a heating member for providing heat located within said housing;
    (c) a food support structure positioned within said housing above said heating member; and
    (d) at least one vent assembly attached to said housing for venting air from an interior of said housing, said vent assembly being extendible through the cutout to an extended position and retractable to a retracted position from said housing, and said vent assembly comprising at least one pin extending outwardly therefrom and movable through the notch, wherein, at the extended position, the vent assembly is rotatable to a locked position at which the pin engages the housing in an offset non-contacting relation to the notch.

2. The barbeque grill apparatus according to claim 1 wherein said vent assembly comprises an elongated tubular chimney element.

3. The barbeque grill apparatus according to claim 2 wherein said chimney element is radially and rotatably movable while attached to said housing and is telescopically movable from said housing.

4. A barbeque grill with a collapsible vent assembly, said grill apparatus comprising:
 (a) a housing having an upper and a lower portion, and an outer surface;
 (b) a heating member for providing heat located within said housing;
 (c) a food support structure positioned within said housing above said heating member; and
 (d) at least one vent assembly attached to said housing for venting air from an interior of said housing, said vent assembly being extendible to an extended position and retractable to a retracted position from said housing;
 (e) wherein said vent assembly comprises an elongated tubular chimney element and a locking member attached to the chimney element;
 (f) wherein said vent assembly is radially and rotatably movable to a locked position while attached to said housing and in the extended position, and wherein said locking member is movable above and into contact with the outer surface of the housing to lock said vent assembly in its extended position.

5. A method of preparing a grill for cooking comprising the steps of:
 (a) providing a grill with at least one extendible and retractable vent assembly;
 (b) rotating said vent assembly to align one or more pins on said vent assembly with one or more notches defined in an upper housing of said grill housing;
 (c) telescopically extending vent assembly upwardly from said grill housing into an extended position wherein the one or more pins slide through the one or more notches of said upper housing;
 (d) securing said vent assembly in its extended position by rotating said vent assembly after step (c) such as to move said one or more pins out of alignment with said one or more notches.

6. The method of claim 5 further comprising the steps of retracting said vent assembly by:
 (a) rotating said vent assembly to again align said one or more pins with said one or more notches; and
 (b) telescopically moving said vent assembly downwardly to its retracted position wherein said one or more pins slide through said one or more.

* * * * *